Oct. 1, 1935.  R. PERRIN  2,015,692
PROCESS OF DEPHOSPHORIZING STEEL
Filed Oct. 25, 1933
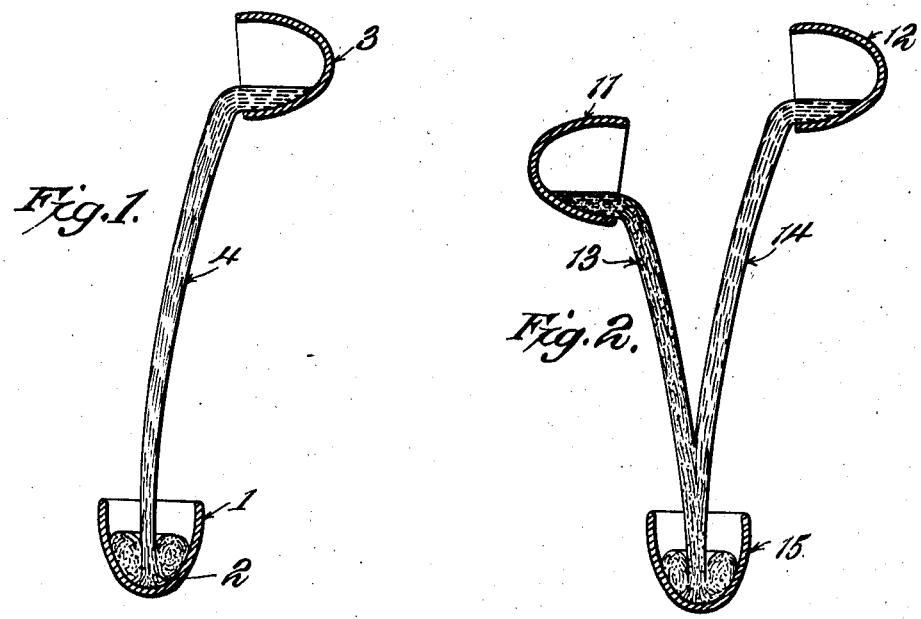
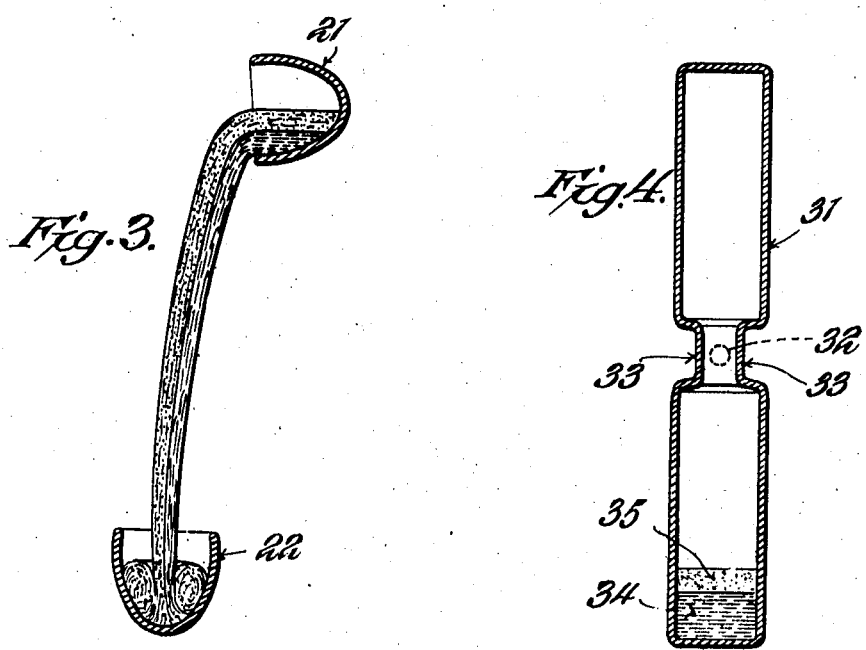
Inventor,
Rene Perrin,
By Maurot Lewis,
Attorneys.

Patented Oct. 1, 1935

2,015,692

UNITED STATES PATENT OFFICE 2,015,692

PROCESS OF DEPHOSPHORIZING STEEL

René Perrin, Paris, France, assignor to Societe d'Electrochimie d'Electrometallurgie et des Acieries Electriques d'Ugine, Paris, France, a corporation of France Application October 25, 1933, Serial No. 695,195
In Italy August 31, 1931

23 Claims. (Cl. 75—46)

One of the principal problems inherent in the metallurgy of iron is that of securing steels as free as possible from phosphorous which, when present even in the minutest quantities, imparts brittleness thereto.

The maximum allowable phosphorus content, varying according to the uses for which the steels are intended, may be averaged as follows:

(a) Commercial steels, rails, girders, etc., between 0.04 and 0.1%.

(b) Semi-fine steels, between 0.025 and 0.04%.

(c) Refined carbon steels, or special steels, 0.025%.

On the other hand, it is known that (1) The manufacture of steel by the acid open-hearth process (Bessemer converter, Martin acid furnace, acid electric furnace, arc furnace, induction furnace, or crucible furnace) fails to remove any phosphorus whatever, (2) That insofar as the basic processes are concerned (a) The usual Thomas converter treatment only permits of the phosphorus content being reduced below 0.08%, approximately, and that at the expense of considerable oxidation of iron, said loss increasing very rapidly if it be sought to reduce the phosphorus content below 0.04%.

(b) When operating by means of the basic Martin furnace, it is necessary to start initially from a charge of pig poor in phosphorus if it be desired to stop treatment at the moment when decarburization has dropped to normal without its being necessary to recarburize later, a factor of great importance in regard to cost. In the use of the Martin furnace, moreover, removal of the slag is commonly resorted to at an intermediate stage of treatment in order to avert that the phosphorus-laden slag should cause ultimate rephosphorization when the metal is being deoxidized.

(c) When the basic electric furnace is used, dealing with a molten charge, and the initial pig-iron charge thereof is not very poor in phosphorus (below 0.025%, approximately), it is necessary to begin with the dephosphorization treatments and follow these later with deoxidation and desulphuration treatments, whereby preliminary operations lasting about one hour are involved, for dephosphorization only.

In effect, it has been possible hitherto to obtain steels having a low phosphorus content from raw materials rich in phosporus, only by means of treatments which may be of long duration in certain difficult cases and which generally entail a considerable loss of metal.

It may hence be stated that, in all countries the processes for the manufacture of steel have been subordinated to the two following considerations:

1. The initial phosphorus content of the raw materials, ores, pigs and scrap.

2. Ultimate phosphorus content to be secured, varying according to the quality of steel to be produced; ordinary, semi-refined or refined.

Thus, the development and even the evolution of the processes for the manufacture of steel in acid or basic hearths, have been determined in all countries by the phosphorus content of the ores at the disposal of those countries. Countries wherein the ores are rich in phosphorus, such as France and Germany, make general use of the basic hearth. The metallurgical works of those countries cannot secure products of quality directly without incurring a serious loss of iron involving a high cost. Therefore, those works which use the Thomas converter and such as use the basic Martin furnace or the basic electric furnace are compelled to resort to intermediate slagging-out, i. e., to work under a handicap. On the other hand, the works of countries such as Sweden, England or the United States, in which ores are poor in phosphorus, apply in the main the acid processes, but the gradual exhaustion of the available supplies of ores poor in prosphorus in those countries leads to the probability that preponderating use must eventually become general of basic furnaces, in most cases duplex and following the Bessemer converter.

These examples prove conclusively that until now the metallurgy of the world has lacked a simple, economical and reliable method for lowering the phosphorus content of steels to any appreciable extent.

For such a method to fulfill these conditions, it is essential that:

1. The removal of the phosphorus, even when the proportion is comparatively high, should be very rapid. It should be carried out with simple apparatus. The treatment should preferably not necessitate the use of outside heating.

2. The results secured should be constant and predeterminable, that is, dephosphorization should be obtained with certainty and with a precision comparable in a degree to that of the known methods, since otherwise the process would not have industrial value.

It should be observed that the two essential conditions of speed and constancy appear to be mutually contradictory. Nevertheless, the present process secures them simultaneously.

In accordance with my process, the steel to be dephosphorized is thoroughly intermixed in a molten condition with a fluid slag which extracts phosphorus from the steel. The mixing is carried out in such a way that the slag is thoroughly and quickly intermixed with the molten steel in a finely divided or dispersed condition. This is preferably accomplished by a violent impact of the molten steel upon the slag, whereby not only is the slag broken up into small particles and dispersed into the steel, but the mass of steel and dispersed slag is given a violent churning or turbulence, insuring the rapid and thorough distribution of the finely dispersed slag throughout the mass of the metal. This is preferably accomplished, as hereinafter more particularly described, by causing a rapidly moving stream or body of molten steel to violently impinge against and into a body of very fluid slag.

The slag employed is a basic slag and sufficiently charged with oxide adapted to be reduced by the phosphorus, such for example, as oxide of iron and oxide of manganese, as to be capable of eliminating from the steel to be treated the desired quantity of phosphorus and still, nevertheless, retain oxidizing value. Should silicon be present in the steel, then an additional quantity of oxide must be provided to eliminate the silicon. Such a slag has a high extracting power for removing the phosphorus from the steel. In other words, a slag is employed such that there is a state of dis-equilibrium between the phosphorus dissolved in the metal and the slag. The intermixing of the slag and steel should be violent and rapid enough to bring about quickly an intimate contact of very large surface area, because of the breaking up of the slag into fine particles, between the slag and metal, resulting in allowing the concentrations of the phosphorus in the metal and in the slag rapidly to approach a state of equilibrium, thus causing a quick transfer of the phosphorus from the metal into the slag. The effect of the impact of the metal against the slag may be aptly described as a turbulent emulsification of the fluid slag and molten metal. Not only is there a tremendously large surface area created between the slag and the metal which permits quick transfer of the phosphorus across the interfaces between the metal and slag particles, making the reaction very rapid, but since the slag and metal are in a condition of violent turbulence or churning, the slag is thoroughly disseminated and hence caused to act immediately upon the metal, as contrasted, for example, with the usual dephosphorizing furnace operation in which the slag remains as a layer upon the top of the steel bath, so that the dephosphorizing action of the slag can be exerted only over a relatively small interfacial area between the slag and metal layers, and in which the equilibrium of phosphorus concentrations within the bodies of the metal and slag layers must take place slowly by diffusion.

The total time required for such thorough and intimate emulsification or dispersion of the slag throughout the body of the metal is very short, for example, usually in the neighborhood of about 1 minute for pouring 15000 kilograms of steel. As soon as the turbulence or churning about of the slag and metal in the mixing container ceases, the slag and metal, which are both in a fluid condition, separate by gravity, leaving the metal substantially free from slag and in a condition to be immediately tapped from the container.

In the drawing,—

Figures 1, 2, 3 and 4 are diagrammatic views showing examples of procedures by which such violent intermixing and thorough dispersion of the slag into the metal may be accomplished.

Referring to Figure 1 of the drawing, reference numeral 1 indicates a container, illustrated as a ladle, in which is placed a molten fluid slag capable of extracting the phosphorus from the steel and in which the intimate mixing of the slag and steel occurs. This body of slag is indicated at 2. The slag is in a highly fluid condition, being preferably heated to about 25 or 30 degrees centigrade above the temperature of the steel to be poured into it. As an illustrative example, 1100 kilograms of slag may be employed for about 14000 kilograms of steel. After the molten fluid slag is put into the ladle 1, a charge of molten steel is poured rapidly into the ladle 1 from a container holding the steel, illustrated as a ladle 3. The ladle 3 is positioned far enough above the ladle 1 so that the stream of steel 4 strikes against the slag with considerable violence. As an illustrative example, a charge of 14000 kilograms of steel is poured from a height of about 10 feet in about 1 minute or less. This rate of pouring furnishes a fairly thick stream of steel which falls with considerable force against and into the slag in the lowermost ladle 1. The kinetic energy of the falling stream of steel causes the breaking-up and intimate admixture of the steel and slag as the steel impinges against the slag. As the stream of steel hits the slag, not only is there an intimate mixing, which is believed to be an emulsification or fine dispersion of the slag into the steel, but there is a violent churning or turbulence of the contents of the ladle, resulting in an immediate intimate and thorough distribution of the dispersed slag in the mass of metal.

This turbulent condition rather quickly subsides due to the frictional dissipation within the mass of the energy of turbulence, whereupon there occurs a rapid and thorough gravity separation of the steel from the slag, resulting in a bath of metal in the bottom of the ladle which is freed from the slag and in a condition to be immediately tapped from the ladle. The very fluid condition of the slag not only permits its dispersion or emulsification with the metal in separated finely divided particles, but allows a thorough and rapid gravity separation of slag and metal. It is to be understood that the example of pouring 14000 kilograms of steel from a height of about 10 feet in about 1 minute is illustrative as typical, and that the height and rate of pouring may be varied. For example, the metal may be poured more slowly, say, from a height of 20 feet, with similar results. In every case, however, the steel should be poured from a sufficient height to cause a violent impact of the steel upon and into the slag such as to cause a violent, quick and intimate admixture of slag and steel to take place.

While I prefer to pour the molten steel into a container previously charged with the molten slag, as shown in Figure 1, the intermixing may be otherwise accomplished. For example, in Figure 2 there are illustrated two ladles 11 and 12 for holding slag and steel, respectively, and from which a stream of slag and stream of steel are poured simultaneously into a receiving and mixing ladle 15. The ladle containing the steel should, of course, be elevated sufficiently above the receiving ladle so that the stream of steel will strike into the receiving ladle with sufficient impact to cause the violent, quick and intimate intermixing of the steel and slag.

In Figure 3 there is illustrated another example in which a container, such as a ladle, 21, is initially charged with a bath of steel having a supernatant layer of molten fluid slag. The pouring ladle 21 is elevated above a receiving ladle 22 and the contents poured into the receiving ladle. The charge should be poured from a sufficient height so that there is a violent intermixing and dispersion of slag and steel due to the arrested kinetic energy of the falling charge. If desired, an arrangement of two ladles, such as shown in Figure 3, may be employed for pouring the charge back and forth a number of times to secure repeated intermixing of the slag and steel. For example, the ladles 21 and 22 may be mounted on suitable elevating mechanisms whereby one ladle may be elevated, say, a distance of 10 to 20 feet above the ladle and the charge poured, and then the emptied pouring ladle is lowered and the full receiving ladle is raised and the charge repoured back into the first ladle.

While for simplicity in illustration I have shown ladles as the containers for pouring and receiving the slag and steel, other suitable containers may be employed. For example, in Figure 1 the steel may be poured or tapped directly from the melting furnace into a ladle or other container placed a suitable distance below it. Also, instead of employing the ladle 1 as a mixing vessel, a previously heated open top furnace may be employed. Similarly, in Figures 2 and 3 furnaces or other suitable containers may be employed instead of the ladles illustrated.

In Figure 4 there is diagrammatically illustrated an arrangement of a single vessel by which a violent intermixing of slag and steel may be accomplished. As illustrated in Figure 4, a relatively long closed container 31, preferably having the general shape illustrated, is trunnioned to be turned about an axis 32. It will be understood, of course, that the drawing is diagrammatic and that the container will be provided with suitable lining and preferably with insulation. The container 31 is preferably provided with restricting portions 33 which serve somewhat as dams to control the discharge of metal and slag from the top to the bottom of the container as the container is inverted. A charge of molten steel 34 and slag 35 is put into the container 31. The container is then quickly inverted and its movements quickly stopped in the vertical inverted position. As the container is being swung into its inverted position, the dam 33 tends to hold back the metal and tends to allow the slag to first fall into the then lower part of the container, to be followed by metal which plunges into the slag. Also, the inertia of the metal will tend to retain the metal into the then upper part of the inverted container from which it falls by gravity into the then bottom part of the container where there is a violent impact of steel with slag to cause a thorough intermixing of the two. As an illustrated example, the container 31 may be 10 to 20 feet in length and may be given several rapid inversions per minute.

While I have illustrated and described specific forms of apparatus for carrying out my process, it is to be understood that the invention is not limited thereto, as the thorough intermixing might be otherwise accomplished. However, in all cases there must be a quick and intimate dissemination or dispersion of the slag in a finely divided condition into the steel of the character obtainable by causing such violent impact that the bodies of slag and steel are broken up and mutually and thoroughly disseminated one into the other.

As above noted, in order to secure effective intermixing or dispersion of the slag and steel, the slag should be in a fluid condition, and it is also essential that the slag be very fluid in order to permit the gravity separation of the metal from the slag after the dephosphorizing operation.

By this process the following dual results are observed:

1. The dephosphorization obtained in this exceedingly short period is ample in most cases to effect the required dephosphorization of the steel, such, for example, as the reduction of the phosphorus content from 0.435 to 0.049, or from 0.055 to 0.012.

2. The results secured are remarkably constant and accurate, such constancy and precision being at least equal to those attending the usual metallurgical treatments. This is due to the fact that despite the very short period of contact between the slag and metal, and equilibrium of the phosphorus is reached practically throughout the mass, as shown by the fact that if the metal is allowed to remain in contact with the supernatant slag for a further long period, its phosphorus content undergoes no further appreciable reduction. This is shown, for example, by the analyses of the first and last ingots tapped from the ladle.

The degree of dephosphorization to be secured can be regulated with precision by calculating the amount and composition of the dephosphorizing slag, since the dephosphorizing action of the slag upon the metal goes to practical completion during the thorough mixing of the slag and metal, despite the short period of time within which it takes place. The results are shown by experience to be quite constant and to exhibit the degree of precision attending the usual metallurgical operations.

The nature of the walls of the container wherein the violent mixing is effected has little, if any, effect upon the dephosphorization owing to the exceedingly short nature of the reaction. In fact, the lining will be attacked but slightly by the slag and the constituents of said lining that become dissolved in the slag are not sufficient in quantity to affect materially the dephosphorizing character of the slag. Therefore the lining of the container may be formed of basic materials as well as of materials of non-basic character, such as for example silico-aluminous bricks, which have the advantage of being quite common and cheap. On the contrary, in the previously known dephosphorizing processes, in which the operation is relatively of long duration, basic materials must be employed for lining the container for the reason that a lining of non-basic character would be rapidly attacked by the basic slag and the nature of the said slag would be thereby materially altered.

The temperature of the metal is naturally of influence, but experience has shown that by the present process extra mild steels may be dephosphorized at very high temperatures in spite of the fact that high temperatures are prejudicial to dephosphorizing reactions.

Should the quantity of phosphorus to be removed be considerable, as, for example, 1.7%, the dephosphorizing treatment may be repeated by means of two or three molten slags.

By my process it is possible to very quickly dephosphorize steel without any additional heat whatever being applied. The cost of the treatment is practically that of the preliminary preparation of the molten dephosphorizing slag.

The quantity of slag to be used depends essentially upon its composition and would be greater, for example, if it be sought to make use of slightly oxidized slag in order to avoid deterioration of the silico-aluminous facing of the container wherein dephosphorization is carried out. The slag should be essentially basic and oxidizing. The basis of the slag may be earth-alkaline or alkaline of any nature, or both if it be desired, to facilitate melting by selecting a low melting point.

The slag should be very liquid at the temperature of the molten steel in order to permit its dissemination in a finely divided state into the steel, as well as the gravity separation of the slag after the reaction is completed. Such fluxes as spar may be added, as well as silica, alumina or the like, provided the slag remains basic. As an example, a slag containing 3% silicic acid, 65% calcium oxide, and 20% iron oxide gives very satisfactory results in most cases.

While lime is the usual basic element employed in the slag, other basic elements, such as other alkaline or alkaline-earth bases such as soda, magnesium or the like, may be used, to partly or wholly replace the lime.

Subject to the necessary amount of slag being provided for efficient intermixing with the steel, the elements of the process, such as the quantity of the slag and its composition, may be calculated beforehand precisely in the same manner as the elements of any chemical process, said calculation being based upon the initial phosphorus content of the steel and the ultimate phosphorus content to be obtained.

The following are cited as typical examples of the process as applied to steels of widely varying phosphorus content.

Example No. 1

A mild steel with an initial carbon content of 0.010% contained 0.436% phosphorus—a very high proportion. A slag was formed containing 3% silicic acid, 60% calcium oxide and 35% iron oxide, and an addition of fluorspar. This slag was heated to a fluid condition. 14000 kilograms of the molten steel, together with 1100 kilograms of the slag, was poured into a ladle from a height of about 10 feet in about 1 minute. The ladle was immediately transferred to the ingot molds and poured, the time required for the transfer of the ladle being sufficient to allow the gravity separation of slag and metal before pouring. The completeness of the dephosphorizing within the short time of the mixing operation is shown by the phosphorus analysis of the ingots, the first ingot showing 0.049% phosphorus and the last ingot 0.042% phosphorus.

In this case a high phosphorus steel, whose content in phosphorus rendered it wholly unfit for use, was brought to a phosphorus content perfectly normal for commercial steels by a dephosphorizing reaction requiring only about 1 minute.

Example No. 2

14000 kilograms of steel having about 0.010% carbon and containing 0.048 to 0.060 phosphorus was poured into a ladle containing 300 kilograms of molten fluid slag consisting of 3% silica, 62% calcium oxide and 25% iron oxide, with an addition of fluorspar. The pouring was from a height of about 10 feet in about 1 minute's time, which gave a fairly thick stream of steel for effecting the thorough dispersion of the slag in the steel and the thorough mixing of the ladle contents by a violent churning action. The ladle was then immediately moved to the ingot molds and tapped. Analysis of the ingots showed phosphorus varying from 0.010 to 0.013%, which is considered excellent for refined and special steels. Steel containing the average phosphorus content of normal Thomas steels was therefore converted in the space of 1 minute or so to a phosphorus content usually in refined steels. The analysis of the first and last four ingots showed substantially the same phosphorus content.

Example No. 3

13500 tons of an electric steel having 0.020% carbon and 0.022% phosphorus was poured as above described into a ladle charged with 300 kilograms of a dephosphorizing slag containing 5% silica, 63% calcium oxide and 20.2% iron oxide, together with an addition of spar. The ladle was then transferred to the ingot molds and poured. The ingots showed a phosphorus content of 0.007%. In this instance, starting from the previously dephosphorized steel, it was possible to secure an extremely low phosphorus content which was definitely below that usually present in refined steels.

The above three examples cover wide variations of phosphorus contents and clearly illustrate the results secured by the process. In the examples the ingots were poured without further treatment, the object being to secure analyses of successive ingots. In the usual practice deoxidation would, of course, follow this dephosphorization.

A few applications may now be cited to show the general application of the process.

1. It is possible to refine by the Bessemer acid treatment pig iron having a higher phosphorus content than that now treated by the Bessemer acid treatment, and to therefore displace the line of demarcation heretofore recognized between pig irons intended for basic as distinguished from those intended for acid treatments. Until now, according to countries, only such pig irons were Bessemer treated which contained a maximum of 0.07% to 0.1% phosphorus. By means of my process and by effecting the treatment described in the casting ladle previous to the addition of the deoxidizing agents, it is possible to treat pig iron containing 1% or even more phosphorus and still obtain a metal with an appropriate phosphorus content, and to secure this benefit at the cost of a very slight extension of the treatment.

2. The reduction of the phosphorus content of Thomas steels. Even when the phosphorus content of Thomas steel was left approximately at 0.08, in order that the iron be not too much burned, it was easy to secure phosphorus contents ranging from 0.010 to 0.025%, i. e., such as are usual in the most highly refined steels.

3. The Martin acid open hearth process may be extended by the substitution of acid open hearth treatment for basic open hearth treatment, by dephosphorizing the metal in accordance with my process before the metal is put into the open hearth.

4. In the case of duplex electric furnace treatment of Thomas steel, for example, my process permits of the electrical treatment being greatly curtailed. By dephosphorizing the steel before it is put into the electric furnace, the electric furnace treatment may be considerably shortened and slagging-off eliminated.

5. Steels may be secured which are exceedingly free from phosphorus. Starting with a steel, an electric steel, for example, containing 0.020 phosphorus, the phosphorus content may be reduced to 0.006 or 0.007.

While, as above stated, the slag for the treatment of usual steels contains a considerable proportion of iron oxide to oxidize the phosphorus, the process may be varied for the treatment of steels containing but little phosphorus (for instance, between 0.03 and 0.07%), but having a considerable quantity of dissolved iron oxide. This is in particular the case with overblown Thomas steels which may be made to undergo an additional dephosphorization in accordance with my process, with the object of reducing the phosphorus content to that which is required for fine steels, e. g., below 0.020%. As is well-known, the Thomas process consists in blowing steel in a basic lined converter for the purpose of removing phosphorus, as well as carbon, from the steel. For that purpose, the modification now to be described consists essentially in considerably reducing the content of the iron oxide in the fused basic dephosphorizing slag, or even using a dephosphorizing slag completely free from iron oxide.

Under these conditions it is the oxide of iron contained in the over-oxidized steel which is used in combination with the basic properties of the slag to secure dephosphorization. In fact, if the two conditions above mentioned are realized, namely, a low content of phosphorus and a high content of iron oxide in the steel, it is found that the quantity of iron oxide dissolved in the steel is sufficient for the formation of calcium phosphate to take place on the violent intermixing of the metal and a molten very fluid basic slag containing no iron oxide. The oxide of iron dissolved in the steel oxidizes the phosphorus which combines with the free lime of the slag.

The principle of the reaction is substantially the same as that of my process first described, but in the present modification, in view of the slight removal of phosphorus to be obtained, due to its small initial content, and the highly oxidized initial state of the steel, the iron oxide dissolved in the steel is sufficient to obtain the desired result and the basic slag need contain little, if any, iron oxide.

Mention has already been made of the formation of calcium phosphate, but it is quite evident that any other alkali-metal or alkaline-earth metal base, such as soda, magnesia or the like, can be used, partly or wholly, to replace the lime in the fused slag.

It is really necessary then, to have a slag as basic as possible, i. e., with a minimum of silica, and to add, if necessary, fluxes such as soda, alumina, magnesia, or other alkali-metal or alkaline-earth metal bases, in order to make it highly fluid, which is essential if an efficient intermixing and high speed of reaction are to be obtained.

By way of an example of the application of the process to a low prosphorus overoxidized steel, may be cited the following:

15000 kilograms of overblown Thomas steel originally containing 0.034% of phosphorus, was poured from a height of about 10 feet in about 1 minute's time into a ladle containing 100 kilograms of a molten fluid slag composed of 17% silica, 8.32% alumina, and the remainder lime and magnesium oxide. The carbon content of the overblown metal was 0.045%, indicating the presence of a high content of iron oxide dissolved in the steel. After dephosphorizing in accordance with my process, the content of phosphorus in the steel dropped to 0.013%, which content is very suitable for fine steels.

In my copending application Serial No. 695,194, filed October 25, 1933, I have described and claimed generically the mechanical procedure of my process wherein the thorough and violent intermixing or dispersion of the slag into the steel is accomplished, and have presented in said application generic claims to this process. The present case is directed specifically to the application of my process to the dephosphorization of steels.

The present application is a continuation in part of my copending applications Serial No. 584,584, filed January 2, 1932, and Serial No. 658,275, filed February 23, 1933.

While I have specifically illustrated and described the preferred procedure in carrying out my process, it is to be understood that the process is not so limited, but may be otherwise embodied and practiced for the dephosphorization of steel within the scope of the following claims.

I claim:

1. The process of dephosphorizing steel, which comprises causing an impact of a body of the molten steel to be dephosphorized with a body of fluid molten dephosphorizing slag with such violence as to cause one to be dispersed into the other in a finely divided condition and form a turbulent mass of intimately intermixed slag and metal in order to bring about a speedy and intimate admixture of slag and metal and thereby quickly effect the dephosphorization of the steel, and allowing the steel to separate from the slag.

2. The process of dephosphorizing steel, which comprises forming a bath of the molten steel to be dephosphorized, forming a bath of fluid molten dephosphorizing slag, pouring the steel into the slag from a sufficient height and with sufficient rapidity to cause one to be intimately dispersed into the other in a finely divided condition and form a turbulent mass of intimately intermixed slag and steel, and allowing the turbulence to subside and the steel to separate from the slag.

3. The process of dephosphorizing steel, which comprises causing intimate and speedy intermixing of the molten steel to be dephosphorized and a fluid molten dephosphorizing slag, by pouring the molten steel from a sufficient height and with sufficient rapidity to make violent impact against and to commingle quickly with the slag, and allowing gravity separation of the steel and slag.

4. The process of dephosphorizing steel, which comprises causing a body of the molten steel to be dephosphorized to fall against a body of fluid molten dephosphorizing slag from a height sufficient to cause an impact violent enough to secure immediate and intimate admixture of the steel and slag and thereby quickly bring about the dephosphorization of the steel, and allowing the steel to separate from the slag.

5. The process of dephosphorizing steel, which comprises forcibly bringing together a mass of the molten steel to be dephosphorized and a mass of fluid molten dephosphorizing slag in such manner as to form a turbulent mixture thereof in a finely divided condition, thereby quickly effecting the dephosphorization of the steel, and allowing the steel to separate from the slag.

6. The process of dephosphorizing steel, which comprises energetically intermixing the steel to be dephosphorized with a molten very fluid dephosphorizing slag, the intermixing being effected by bringing the molten metal and molten slag together with such violent intensity that it will cause a speedy and intimate admixture in the nature of an emulsion of the slag and steel, and separating the slag from the steel.

7. The process of dephosphorizing steel, which comprises forming a molten bath of steel to be dephosphorized, forming a separate bath of fluid molten dephosphorizing slag, bringing together the said baths, and intermixing the slag and steel with such intensity and intimacy as to bring about a metal-slag equilibrium substantially instantaneously and with an approximate simultaneity throughout the bath.

8. The process of dephosphorizing steel, which comprises blowing the steel in a basic converter to partially remove the phosphorus and introduce a considerable quantity of iron oxide into the steel, and thereafter violently intermixing the molten steel with a fluid molten dephosphorizing slag relatively poor in iron oxide.

9. The process of dephosphorizing steel, which comprises so treating the steel as to partially remove the phosphorus and introduce a considerable quantity of iron oxide into the steel, and thereafter dephosphorizing the steel by forcibly bringing together the molten steel and a fluid molten dephosphorizing slag relatively poor in iron oxide with such violence as to cause one to be dispersed into the other in a finely divided condition and form a turbulent mass of intimately intermixed slag and metal in order to bring about a speedy and intimate admixture of slag and metal and thereby quickly effect the dephosphorization of the steel, and allowing the steel to separate from the slag.

10. The process of dephosphorizing steel, which comprises blowing the steel in a basic converter to partially remove the phosphorus and introduce a considerable quantity of iron oxide into the steel, forming a bath of fluid molten dephosphorizing slag relatively poor in iron oxide, causing an impact of the molten steel with the molten slag with such violence as to cause one to be dispersed into the other in a finely divided condition and form a turbulent mass of intimately intermixed slag and steel in order to bring about a speedy and intimate admixture of slag and steel and thereby quickly effect the dephosphorization of the steel, and allowing the steel to separate from the slag.

11. The process of dephosphorizing steel, which comprises treating the steel so as to partially remove the phosphorus and form a considerable quantity of iron oxide in the steel, forming a bath of fluid molten dephosphorizing slag relatively poor in iron oxide, and intermixing the slag and steel with such intensity and intimacy as to bring about quickly a substantially complete dephosphorization of the steel.

12. The process of dephosphorizing steel, which comprises bringing together forcibly in a container having a silico-aluminous lining a mass of molten steel to be dephosphorized and a mass of fluid molten dephosphorizing slag in such manner as to form a turbulent mixture thereof in a finely divided condition, thereby quickly effecting the dephosphorization of the steel, and allowing the steel to separate from the slag.

13. A process for the dephosphorization of steel containing a large proportion of iron oxide and but a little phosphorus, which consists in finely dividing and violently intermixing with the steel a molten fluid basic slag containing a small proportion of oxidizing agent, and separating the steel from the slag.

14. A process for the dephosphorization of steel containing a large proportion of iron oxide and but little phosphorus, which consists in finely dividing and violently intermixing with the steel a molten fluid basic slag containing a small proportion of iron oxide, and separating the steel from the slag.

15. A process for the dephosphorization of steel containing a large proportion of iron oxide and but little phosphorus, which consists in imparting kinetic energy to a mass of molten steel and utilizing said energy for bringing said steel forcibly into contact with a molten fluid basic slag containing a small proportion of iron oxide so as to effect minute subdivision of said slag and to intermix violently said finely divided slag with the said steel, and separating the steel from the slag.

16. A process for the dephosphorization of steel containing a large proportion of iron oxide and but a little phosphorus which comprises pouring into a ladle molten fluid basic slag containing a small proportion of iron oxide, then violently pouring molten steel in a thick jet from a considerable height onto said slag and separating the steel from the slag.

17. In a process for the dephosphorization of steel containing a large proportion of iron oxide and but a little phosphorus with molten fluid basic slag containing a small proportion of iron oxide, the step which consists in violently intermixing the steel and slag together, the degree of violence being such that the metal-slag equilibrium is reached before the steel is separated from the slag.

18. In a process for the dephosphorization of steel containing a large proportion of iron oxide and but a little phosphorus with molten fluid basic slag containing a small proportion of iron oxide, finely dividing the slag and intimately mixing it with steel until the equilibrium between metal and slag is obtained, and separating the steel from the slag.

19. In a process for the dephosphorization of steel containing a large proportion of iron oxide and but a little phosphorus with molten fluid basic slag containing a small proportion of iron oxide, the step which consists in violently intermixing the steel and slag together and then separating the steel from the slag, the violence being such that the chemical equilibrium between the metal and the slag is reached nearly instantaneously, the dephosphorizing process itself and the separation of the steel from the slag taking place within approximately one minute for a running of approximately 15 tons of steel.

20. A process for the dephosphorization of steel containing a large proportion of iron oxide and but a little phosphorus, wherein a molten fluid basic slag containing a small proportion of iron oxide is prepared in a separate furnace, a sufficiency thereof is run out of the furnace and is finely divided and violently commingled with the molten steel to be dephosphorized, and the steel is separated from the slag by gravity.

21. In the process for the dephosphorization of steel containing a large proportion of iron oxide and but a little phosphorus with molten fluid basic slag containing no iron oxide, the step which consists in violently intermixing the steel and slag together and then separating the steel from the slag, the violence being such that the chemical equilibrium between the metal and the slag is reached nearly instantaneously, the dephosphorizing process itself and the separation of the steel from the slag taking place within approximately one minute for a running of approximately 15 tons of steel.

22. A process for the dephosphorization of steel containing a large proportion of iron oxide and but a little phosphorus, wherein a molten fluid basic slag containing no iron oxide is prepared in a separate furnace, a sufficiency thereof is run out of the furnace and is comminuted and quickly dispersed within the molten steel to be dephosphorized, and the steel is separated from the slag by gravity.

23. In a process for dephosphorizing steel containing a high percentage of FeO and but little phosphorus, comminuting a basic slag containing little iron oxide and quickly dispersing it within said steel, said slag containing lime, magnesia and a sufficient amount of silica and alumina to render it fluid.

RENÉ PERRIN.